United States Patent [19]
Leeds

[11] Patent Number: 5,463,817
[45] Date of Patent: Nov. 7, 1995

[54] PICTURE FRAME LEVELING DEVICE

[76] Inventor: Richard A. Leeds, 10907 SE. 23rd St., Bellevue, Wash. 98004

[21] Appl. No.: 263,373

[22] Filed: Jun. 20, 1994

Related U.S. Application Data

[63] Continuation-in-part of Ser. No. 104,714, Aug. 11, 1993, abandoned.

[51] Int. Cl.$^6$ .................................................. G01C 9/20
[52] U.S. Cl. .................................................. 33/371; 33/377
[58] Field of Search ............................... 33/370, 371, 374, 33/377, 379, 383, 389, 390, 283, 285

[56] References Cited

U.S. PATENT DOCUMENTS

| | | | |
|---|---|---|---|
| 2,559,961 | 7/1951 | Howell | 33/374 |
| 2,584,917 | 2/1952 | Powell | 33/377 |
| 3,269,729 | 8/1966 | Morrison | 33/389 X |
| 3,422,544 | 1/1969 | Wyse | 33/379 X |
| 3,871,104 | 3/1975 | Underhill, II | 33/377 X |
| 4,100,681 | 7/1978 | Hollander | 33/389 |
| 4,194,122 | 3/1980 | Mitchell et al. | |
| 4,782,597 | 11/1988 | Mills | 33/370 |
| 4,854,047 | 8/1989 | Conanan | 33/377 |
| 4,944,094 | 7/1993 | Depiano et al. | 33/371 |
| 5,063,679 | 11/1991 | Schwandt | 33/370 |

FOREIGN PATENT DOCUMENTS

| | | | |
|---|---|---|---|
| 3800155 | 7/1989 | Germany | 33/377 |
| 0243812 | 10/1991 | Japan | 33/377 |
| 4181116 | 6/1992 | Japan | 33/377 |

OTHER PUBLICATIONS

Branko Breyer, "Goniometer for Transducer Arrays", Ultrasound in Med. & Biol., vol. 2 No. 2, Feb. 1976, pp. 135–136.

Primary Examiner—Alvin Wirthlin
Attorney, Agent, or Firm—Seed and Berry

[57] ABSTRACT

A leveling device is provided that has a hollow thin rectangular housing and is constructed of transparent plastic. The housing holds two different types of fluids, such as oil and water, or a mix of air and fluid. The two immiscible fluids allow the device to be used as a level which operates when the line between the fluids aligns with a datum line that is etched or marked upon the surface of the transparent housing. The device can be attached to an article to be leveled by an adhesive back on the leveling device or alternatively by thumb tacks inserted through holes provided in the housing of the device. The relatively long line between fluids allows the device to be used in judging the degree to which the article is non-level relative to its environment, and also allows the device to hang an article at a specific angle relative to a wall, floor or ceiling. A version of the level can be constructed with a flexible and bendable housing to allow the level to be used to align objects of any shape.

8 Claims, 3 Drawing Sheets

PICTURE FRAME LEVELING DEVICE

RELATED PATENT APPLICATIONS

The present application is a continuation-in-part of the U.S. patent application Ser. No. 08/104,714, filed Aug. 11, 1993, now abandoned.

BACKGROUND OF THE INVENTION

The present invention relates to a leveling device for hanging pictures, posters, or other articles upon walls. The main problem with hanging articles upon walls is to achieve a level position for the article in a quick and easy manner. Often, people simply eyeball the article relative to the surrounding wall, ceiling and floor to attempt to achieve the level position. This method can result in many trial and error adjustments of the picture frame, poster, etc. For many people, hanging such articles is a two person operation with one person standing a distance away from the article judging its leveled position while another person holds and hangs the article. The two person operation usually results in several trial and error adjustments, also.

The second way to hang articles is to use some type of leveling device. Most leveling devices are meant for precision leveling in construction, and therefore are relatively large and expensive. Nevertheless, leveling devices can be of great assistance in achieving a level position for a hung article. A leveling device constructed specifically for hanging picture frames is disclosed within U.S. Pat. No. 4,100,681 to Hollander. This leveling device has the advantages of being relatively simple, lightweight, and easy-to-use for hanging pictures. Hollander's level is basically a linked series of transparent plastic blister packs that each contain a quantity of fluid having a bubble. The bubble-within-fluid type of leveling device is generically termed a "spirit" level. A spirit level achieves its function by aligning a straight edge of the level with an edge of the article, and adjusting the article's angle until the bubble is centered within the surrounding liquid. The Hollander leveling device is a series of disposable levels that are connected together by perforations and are rolled up to form a relatively small package. Each blister pack is a separate level with an adhesive back that is fastened to a picture frame that is to be hung. After the picture is hung, the device is removed and disposed of.

The present invention attempts to improve upon all prior art levels, including Hollander, by providing a level that is compact, sturdy, flexible and re-usable. The present invention also allows alignment of an article at any angle, and has a relatively large viewing area within the level so that the person aligning an article can either stand at a substantial distance from or very close to the article and level, yet still see the horizontal, angular, or vertical condition of the level relative to its datum line. In some environments, it is convenient for one to stand back from articles that aren't entirely squared to vertical and horizontal lines in order to view the angle of the article relative to any imperfections in the article's environment. In other environments, space limitations will prevent one from viewing the article at a distance, and one needs to be assured that the article is level across its length while being viewed up close. The elongated level of the present invention is well suited for hanging articles in both of these type of environments. The level of the present invention is also unique in its ability to level 3-dimensional objects in free space. For example, hanging artistic mobiles can be difficult with conventional levels, but can be achieved easily with the present invention.

The prior art has generally been lacking in providing a simple and easy-to-use leveling device that can be used in all types of environments, that is re-usable, and that can judge the degree of angle of an article relative to its environment.

SUMMARY OF THE INVENTION

It is an object of this invention to provide a leveling device for assisting in hanging articles upon a wall that is easy-to-use and re-usable.

Another object of the invention is to provide a leveling device that can be used to judge the angle of an article relative to its surrounding environment.

Another object of the invention is to provide a single level device that can align non-flat articles, multiple articles, and relatively large articles.

It is a further object of the invention to provide a leveling device that is compact, lightweight, easy and inexpensive to manufacture, and durable in its construction.

Other objects of the invention will be apparent hereinafter from the specification and from the recital of the appended claims, particularly when read in conjunction with the accompanying drawings.

The present invention comprises a leveling device that has a thin typically rectangular housing that is constructed of transparent plastic. The housing holds two different types of fluids, such as oil and water, or air and fluid. The fluids (or air and fluid) allow the device to be used as a level which typically operates when the line between the fluids aligns with a datum line that is etched or marked upon the surface of the transparent housing. The device includes a simple attachment means, such as an adhesive back, that can be easily attached to and unattached from the picture frame, poster, etc. to be hung. The relatively long line between fluids allows the device to be used in judging the degree to which the article is non-level relative to its environment, and also allows the device to hang an article at a specific angle relative to a wall, floor or ceiling.

DETAILED DESCRIPTION OF THE INVENTION

Figure 1:
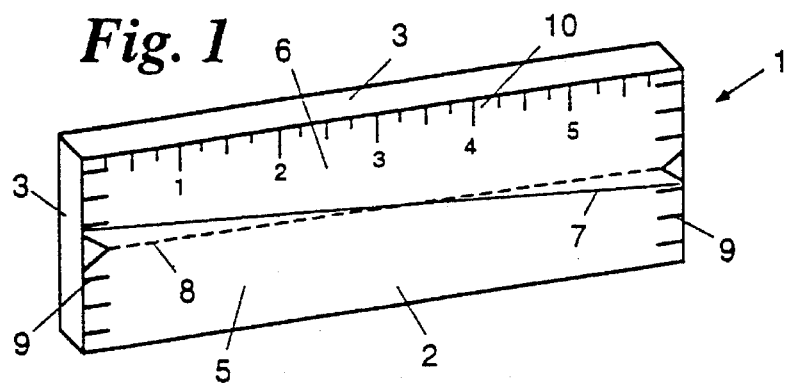
FIG. 1 shows a perspective view of a first embodiment of the leveling device of the present invention.

FIGS. 1–4 show a first embodiment of the leveling device of the present invention. The device consists of a hollow thin rectangular body portion 1 that is constructed of a transparent or translucent plastic. The body includes a front face 2, four side edges 3, and a rear face 4. The hollow body 1 contains a predetermined volume of fluid 5 and air 6. It should be appreciated that the invention could easily be achieved with any two immiscible media. For example, oil and water is an example of two fluids that do not mix. There are also very fine and round solid granular materials that flow in much the same manner that a fluid flows, and such materials would also be effective in the present invention. The most important aspect of use of the two immiscible media is that both media are of sufficient volume within the level to allow the interface between the two media to form a straight line. The straight interface line allows the user of the level to compare the angle of the object-to-be-leveled relative to horizontal (which is defined by the interface line). This is in distinction to common bubble-type levels which employ an elliptical interface between the air and the fluid to only allow one to judge whether an object is level or not, and does not allow one to judge the relative degree that an object is off from level.

Figure 7:
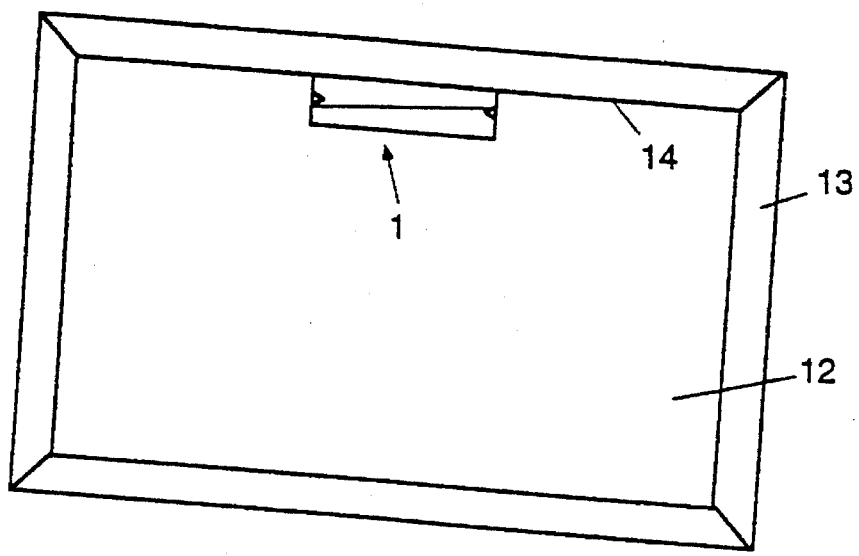
FIG. 7 shows a front plan view of the device of FIG. 1 being used in hanging a picture frame.

A line 7 forms between the two media, fluid 5 and air 6. This line forms the level line used to judge whether an article that the device is attached to is level or not. When using the device the fluid/air interface line 7 is compared to the datum line 8 which is etched or marked on the outer surface of the front face 2. For simple leveling applications, the article will be adjusted until the interface line 7 becomes collinear with the datum line 8. For example, FIG. 7 shows an application where the level 1 is attached to a straight edge 14 of a frame 13 which holds a picture 12. The picture frame 13 is not quite level in this view which is indicated by the fact that the interface line 7 is at an angle relative to the datum line 8. To complete the leveling operation, one merely needs to tilt the frame until the interface line is covered by, or is collinear with, the datum line.

The level further includes markings on the front face 2. A first set of markings 9 along the sides of the front face provide an indication of how far off from horizontal that an article is. This can be especially handy when a series of articles are to be hung at a specific angle. Once the first article is hung, the intersection of the interface line 7 with the markings 9 is noted, and each subsequent article is hung at this specific marking. The markings 9 are also useful when hanging an article in a non-squared environment. For example, if a picture frame that is hung at a specific angle actually looks level or horizontal due to the non-squared walls, ceiling, and/or floor surrounding the picture, then the markings 9 can be used to give an approximation of how far off from horizontal is the surrounding environment. The markings 10, along the top edge of the front face 2 can provide the level with a means of measurement which functions as a ruler.

Figure 2:
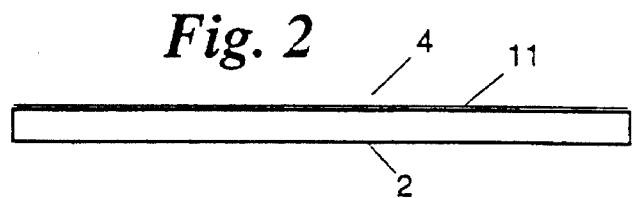
FIG. 2 shows a top plan view of the device of FIG. 1.
Figure 3:
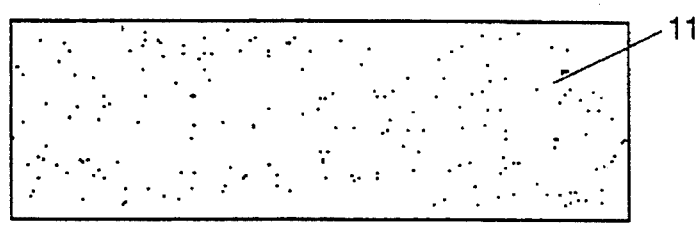
FIG. 3 shows a side plan view of the device of FIG. 1.
Figure 4:
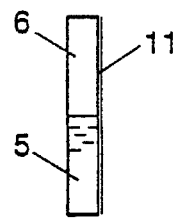
FIG. 4 shows a rear plan view of the device of FIG. 1.

FIGS. 2–4 show the means of attachment of the leveling device. In this case, the means of attachment is an adhesive backing 11 that provides the device with a means of sticking to a surface. This adhesive can easily secure the device to the glass overlaying the picture, or can secure the device directly to the frame. A common form of the adhesive that could be used in the present invention is manufactured by 3M, Inc., for use on a product called Post-It® Notes. In one version of this adhesive manufactured by 3M, Inc., the adhesive is manufactured of a pressure sensitive coating composition to allow release and re-attachment of a sheet to another object. One example of such a composition is a vinyl-siloxane block copolymer. This type of adhesive is relatively strong, but does not leave any sticky film or residue once the adhesive is detached from the article. The use of such a block copolymer adhesive as the adhesive backing 11 allows the level 1 to be attached to a surface, released from the surface, and subsequently re-attached to another surface, to allow many subsequent re-uses of the level of the present invention. The adhesive 11 could be provided with a smooth thin film (not shown) to cover and protect the adhesive when the leveling device is not in use.

Figure 5:
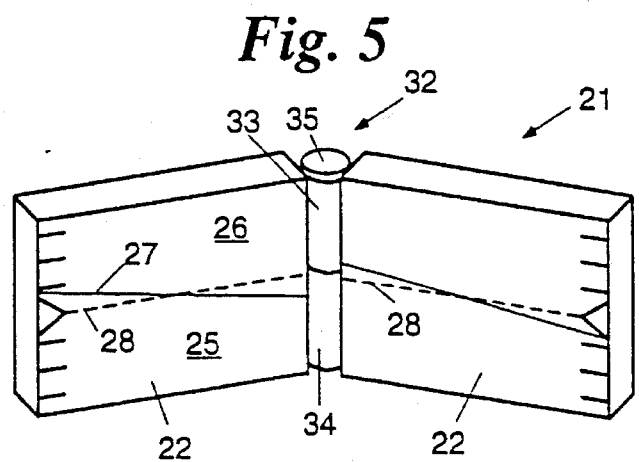
FIG. 5 shows a perspective view of a second embodiment of the leveling device of the present invention.
Figure 6:
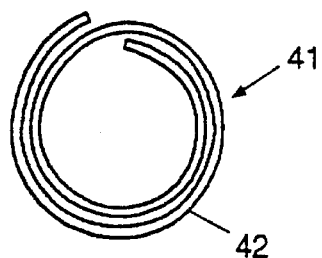
FIG. 6 shows a top plan view of a third embodiment of the leveling device of the present invention.

FIG. 5 shows a second embodiment of the invention. The leveling device includes two asymmetrical body portions 21 with a hinge assembly 32 therebetween to allow the device to be folded into a more compact unit. Both hollow body portions include a front face 22 a first liquid media 25, a second air media 26, an interface line 27 between the two media, and a datum line 28 etched across the front face 22. The level device operates substantially in the same manner as the leveling device of FIGS. 1–4. The hinge assembly 32 includes hinge pin housings 33 and 34 integrally extending from the body portions 21. A hinge pin 35 extends through the hinge pin housings to complete the hinge assembly.

FIGS. 6 and 11–13 show a third embodiment of the invention that has a compact form when the device is not in use, similar to the FIG. 5 version. In this case the body 41 is formed of a pliable plastic as opposed to the rigid plastic construction of the FIG. 1 version. The pliable plastic construction allows the device to be rolled up into a coiled cylindrical configuration, as shown, to allow the device to be easily stored. In use, the device would be unrolled and straightened out into a substantially flat, planar configuration, and subsequently used in the same manner as the leveling device 1 of FIGS. 1–4. In this embodiment the front surface 42 of the pliable level, when flattened to a planar form, corresponds in function to the front surface 2 of the embodiment of FIGS. 1–4.

Figure 11:
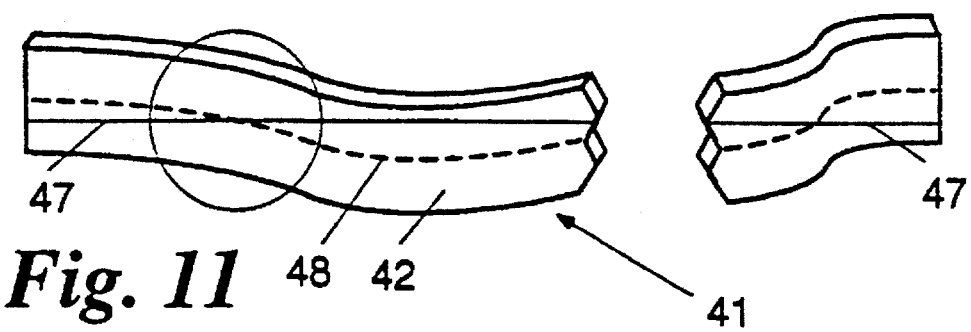
FIG. 11 shows a partial perspective view of the third embodiment of the leveling device of FIG. 6.
Figure 12:
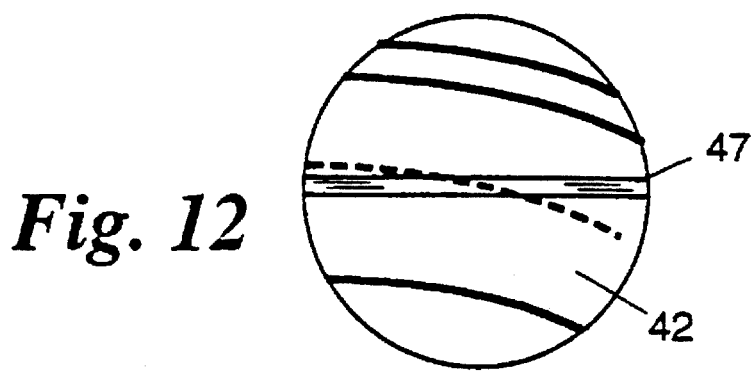
FIG. 12 shows a detailed section of FIG. 11.
Figure 13:
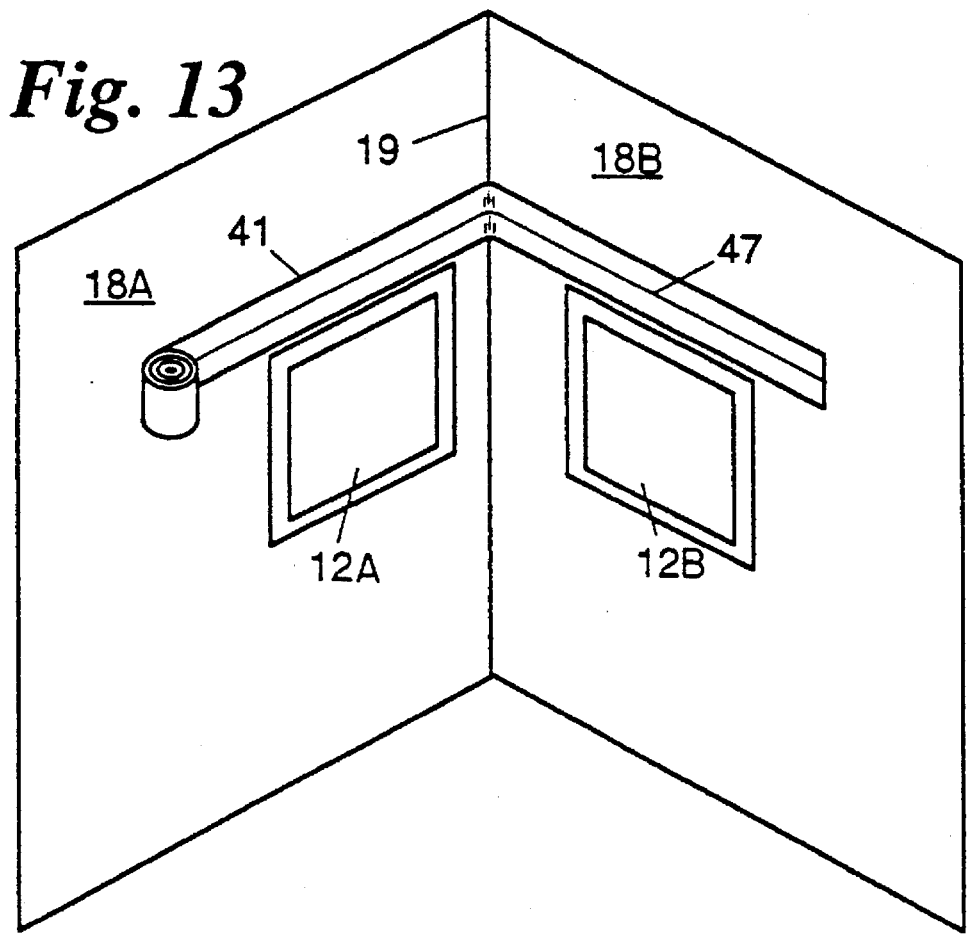
FIG. 13 shows a perspective view of two walls, each having an article to-be-leveled by the single level depicted in FIGS. 6, 11 and 12.

The level can be attached to a non-liar surface of an article for allowing non-planar objects to be leveled using the present invention. For example, FIG. 13 depicts a leveling environment where a single level 41 is used to align two separate pictures 12A and 12B mounted upon two separate walls 18A and 18B. The level need only be partially unrolled to stretch across one wall, bend inwardly at the corner 19 between the two walls, and finally stretch across the second wall 18A. In this manner, one or more pictures upon different walls can be leveled because the level is flexible and can bend around a corner. It should be appreciated that the level can be used in a partially rolled state in much the same manner that a rolled tape measure is used. For example, the level of FIG. 6 could be manufactured to a long length that is rolled up, and, in use, the level would be rolled out only across a span that is intended to be leveled. FIG. 11 shows that the embodiment of FIG. 6 can also be made to be flexible in two directions to conform to different leveling environments. In this case a single fluid interlace line 47 is formed even though the level is flexed to a significant degree. This ensures leveling accuracy at different points along the length of the level. Thus, the datum line 48 can be compared to the fluid interface line 47 at any point along the flexed level.

Another non-flat leveling environment that can be easily achieved with the level of the present invention is in the hanging of individual items of an artistic mobile. In this case, three-dimensional objects hanging in free space would be difficult to align using conventional levels, but with the bendable level of FIGS. 6 and 11–13 the level can be easily attached to multiple objects within a single hanging mobile. In fact, this level could be used to align or level practically any three-dimensional object.

Figure 8:
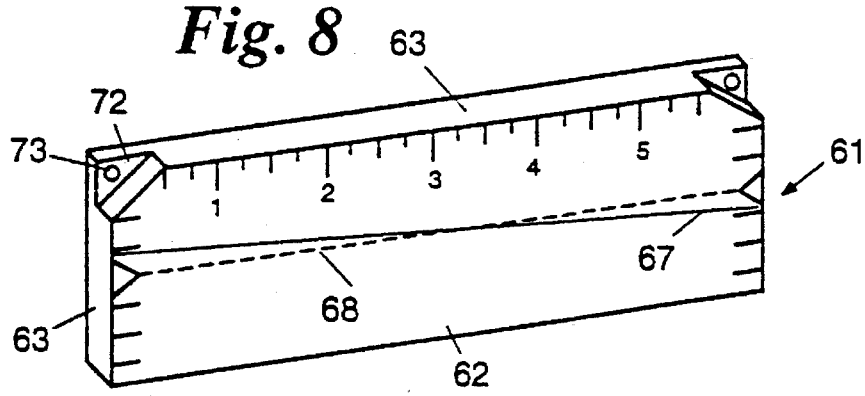
FIG. 8 shows a perspective view of a fourth embodiment of the leveling device of the present invention.

FIG. 8 shows a fourth embodiment of the invention that is very similar to the version of FIGS. 1–4. The hollow body 61 includes a front face 62, an interlace line 67 between the two media, and a datum line 68. The means for attaching the level device to an article is changed in this version. The top corners of the edges 63 of the body are formed as triangular recesses 72 that have apertures 73 formed therethrough. The apertures can be used to insert tacks or pins (not shown) to attach the device to a picture frame, poster, etc. In all other operational and structural aspects the device 61 is substantially similar to the device of FIGS. 1–4.

Figure 9:
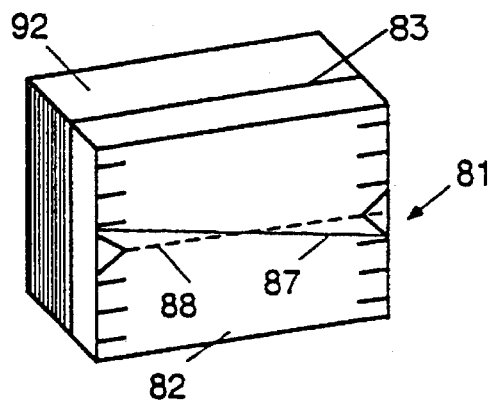
FIG. 9 shows a perspective view of a fifth embodiment of the leveling device of the present invention.

FIG. 9 shows a fifth embodiment of the invention that shows the leveling device 81 packaged in conjunction with the aforementioned Post-It® Notes. Post-It Notes are in the form of a pad 92 that comprises individual sheets or notes each having an adhesive back and arranged together to form a pad. The adhesive back of each sheet has a separate layer of adhesive with a predetermined capacity for bonding to a surface of the article or object-to-be-leveled. A final or rearwardmost one of the sheets of the pad 92 provides the adhesive that serves to attach the device 81 to the object-to-be-leveled. When the adhesive of the final sheet loses its bonding capacity due to repeated attachment and removal from the object or objects-to-be-leveled, the final sheet is removed from the pad 92, and a new final sheet of the pad is exposed for use in attaching the device to the object-to-be-leveled. The body of the device 81 is smaller than used with the embodiment of FIGS. 1–4, and is formed with a front face 82 having a datum line 88 that is compared m the fluid interface line 87. The device 81 would have surface 83 that would initially be stuck by adhesive to the first sheet of the pad 92 of Post-It Notes. The device 81 would be marketed and sold with the Post-It Notes. To use the device 81, the used final sheet of the pad 92 or any protective cover sheet is pulled away from the other sheets of the pad and the device is used in the same manner as described for the embodiment of FIGS. 1–4. The sheets of the pad also have separate utility when used with the leveling device of the present invention. For example, the device 81 can be manufactured with a transparent body portion, as described above for the embodiment of FIGS. 1–4, but with the sheets of the pad 92 each containing angular orientation markings for alignment with the fluid interface line 8, to serve as level indicator alignment marks, datum lines and/or angular markings. The angular markings can be provided on one back and feet and inches markings can be provided on another sheet so that different sheets can be used as additional accessories in the leveling process.

Figure 10:
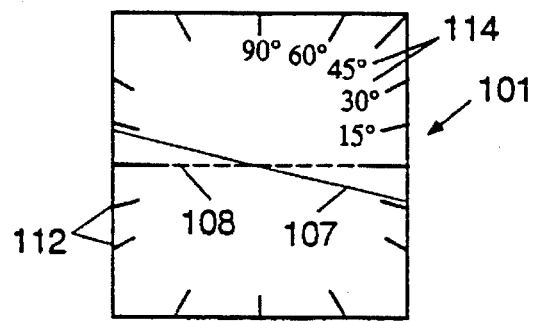
FIG. 10 shows a front plan view of a sixth embodiment of the leveling device of the present invention.

FIG. 10 shows a sixth embodiment of the invention that shows the body 101 in a form that is similar in function to a protractor for measuring angles. In this case, the front face shows a datum line 108 and a fluid interface line 107. The front face also includes a plurality of angled markings 112 arranged around the periphery of the front face. The markings shown in FIG. 10 correspond to angles of 15°, 30° and 60° from the datum line. It should be appreciated that a 45° angle from the datum line can also be easily seen stretching from the center point of the datum line to any one of the four corners of the square front face. The purpose of these angled markings is to allow an article to be hung at a precise angle other than horizontal. To hang a picture at the precise angle, the device is attached to the article in a similar fashion as shown in FIG. 7. Then, the article is turned until the fluid interface line 107 aligns with the desired angled markings 112. Numerals 114 can be imprinted on the face to assist in the article positioning process.

The flexible version of the level depicted in FIGS. 6 and 11–13 would allow many more industrial applications for aligning more than one object relative to one another. The single fluid interface line 47, depicted in FIG. 11, would provide a horizontal indication across the entire length of the level even when the level is stretched across very long spans. Many industrial applications would require the leveling of objects across a much greater length than household applications. Also, many industrial applications would require the level to bend around intervening objects between two articles that need to be aligned. The present invention is unique in that the flexible level can be manufactured to any length.

The different modifications of the basic design of the leveling device of FIG. 1 show the flexibility of this design to achieve a number of different measuring and leveling applications. The device can also be packaged in a wide variety of ways. The device is simple and inexpensive in design and manufacture, effective in its use, and easy to operate.

It should be apparent that many modifications could be made to the leveling device which would still be encompassed within the spirit of the present invention. It is intended that all such modifications may fall within the scope of the appended claims.

What is claimed is:

1. A leveling device for assisting in adjusting the angular orientation of a plurality of articles, comprising:

a level indicator including a body having a rear surface; and a pad of sheets attached to said body at said body rear surface, each of said sheets of said pad having a separate layer of adhesive with a predetermined capacity for removably attaching to a next rearward one of said sheets and a surface of one of the articles, said adhesive of a final sheet of said pad located at a rearward end of said pad providing adhesive for removably attaching said body to one of the articles, said adhesive of said final sheet being removable from the article to which attached without marring the article, while retaining a substantial portion of said adhesive to be used in removably attaching said body to the same article or another one of the articles, upon said adhesive of said final sheet losing its capacity for removably attaching said body, said final sheet being removable from said pad, wherein said adhesive of a new final sheet of said pad is exposed for use in removably attaching said body to the same article or another one of the articles.

2. The device, as claimed in claim 1, wherein, said body is transparent and at least one of said sheets of said pad contains angular orientation markings visible through said body for alignment with said level indicator.

3. A leveling device for assisting in leveling an article to be mounted to a substantially vertical surface, comprising:

an elongated body having a longitudinal axis with first and second end portions separated along said longitudinal axis, said body having a front wall formed from an elongated strip of substantially flat flexible material with an elongated central portion extending between said first and second body end portions and a perimeter portion extending fully about said front wall central portion, and a rear wall formed from an elongated strip of substantially flat flexible material with an elongated central portion extending between said first and second body end portions and a perimeter portion extending fully about said rear wall central portion, said front and rear wall central portions being in face-to-face juxtaposition and extending substantially coextensive with each other, said front and rear wall central portions being spaced apart and said front and rear wall perimeter portions being sealably joined together fully about said front and rear wall central portions to define a single continuous, elongated fluid-tight chamber extending between said first and second body end portions, said front wall being substantially transparent and said body having a level indicator straight line extending between a position toward said first body end portion and a position toward said second body end portion;

a first fluid within said elongated body chamber; and a second fluid within said elongated body chamber, said second fluid being immiscible with said first fluid to form a visible interface line between said first and second fluids extending between said first and second body end portions and which is in parallel alignment with said level indicator line when said rear wall is positioned flat against the surface and said level indicator line is horizontal.

4. A device for assisting in adjusting the angular orientation of an article to be mounted to a substantially vertical surface, comprising:

an elongated body having a longitudinal axis with first and second end portions separated along said longitudinal axis, said body having a substantially flat front wall formed from a flexible material with an elongated central portion extending between said first and second body end portions and a perimeter portion extending fully about said front wall central portion, and a rear wall formed from a flexible material with an elongated central portion extending between said first and second body end portions and a perimeter portion extending fully about said rear wall central portion, said front and rear wall central portions being in face-to-face juxtaposition and extending substantially coextensive with each other, said front and rear wall central portions being spaced apart and said front and rear wall perimeter portions being sealably joined together fully about said front and rear wall central portions to define a single continuous fluid-tight chamber extending between said first and second body end portions, said front wall being substantially transparent and said body having an angular orientation marking, said body and said body chamber being bendable along the entire length of said body;

a first fluid within said body chamber; and a second fluid within said body chamber, said second fluid being immiscible with said first fluid to form a visible interface line between said first and second fluids extending between said first and second body end portions and which is in alignment with said angular orientation marking when said rear wall is substantially vertically oriented and said body is angularly oriented in a selected position.

5. A device for assisting in adjusting the angular orientation of an article to be mounted to a substantially vertical surface, comprising:

an elongated body having a longitudinal axis with first and second end portions separated along said longitudinal axis, said body having a substantially flat front wall formed from a flexible material with an elongated central portion extending between said first and second body end portions and a perimeter portion extending fully about said front wall central portion, and a rear wall formed from a flexible material with an elongated central portion extending between said first and second body end portions and a perimeter portion extending fully about said rear wall central portion, said front and rear wall central portions being in face-to-face juxtaposition and extending substantially coextensive with each other, said front and rear wall central portions being spaced apart and said front and rear wall perimeter portions being sealably joined together fully about said front and rear wall central portions to define a single continuous fluid-tight chamber extending between said first and second body end portions, said front wall being substantially transparent and said body having an angular orientation marking, said body and said body chamber being rollable into a roll about said first body end portion, said roll having a plurality of turns;

a first fluid within said body chamber; and a second fluid within said body chamber, said second fluid being immiscible with said first fluid to form a visible interface line between said first and second fluids extending between said first and second body end portions and which is in alignment with said angular orientation marking when said rear wall is substantially vertically oriented and said body is angularly oriented in a selected position.

6. A device for assisting in adjusting the angular orientation of an article to be mounted to a substantially vertical surface, comprising:

an elongated body having a longitudinal axis with first and second end portions separated along said longitudinal axis, said body being formed from a flexible material with an elongated, single continuous fluid-tight chamber extending between said first and second body end portions, said body having a transparent front wall and a rear wall, said body and said body chamber being bendable along the entire length of said body;

a first fluid within said body chamber; and a second fluid within said body chamber, said second fluid being immiscible with said first fluid to form a visible interface line between said first and second fluids extending between said first and second body end portions to indicate the angular orientation of said body when said rear wall is substantially vertically oriented and said body is angularly oriented in a selected position.

7. A leveling device for assisting in simultaneously leveling first and second articles by holding the device in a single position with the first article to be mounted to a first substantially vertical surface and the second article to be mounted to a second substantially vertical surface where the first and second surfaces are not coplanar, comprising:

an elongated body having a longitudinal axis with first and second end portions separated along said longitudinal axis, said body having a front wall formed from an elongated strip of substantially flat flexible material with an elongated central portion extending between said first and second body end portions and a perimeter portion extending fully about said front wall central portion, and a rear wall formed from an elongated strip of substantially flat flexible material with an elongated central portion extending between said first and second body end portions and a perimeter portion extending fully about said rear wall central portion, said front and rear wall central portions being in face-to-face juxtaposition and extending substantially coextensive with each other, said front and rear wall central portions being spaced apart and said front and rear wall perimeter portions being sealably joined together fully about said front and rear wall central portions to define a single continuous, elongated fluid-tight chamber extending between said first and second body end portions, said front wall being substantially transparent and said body having a level indicator straight line extending between a position toward said first body end portion and a position toward said second body end portion, said body and said elongated body chamber therein being lengthwise bendable to simultaneously conform to the first and second surfaces when said rear wall is simultaneously in contact with both the first and second surfaces;

a first fluid within said elongated body chamber; and a second fluid within said elongated body chamber, said second fluid being immiscible with said first fluid to form a visible interface line between said first and second fluids extending between said first and second body end portions and which is in parallel alignment with said level indicator line when said rear wall is positioned against both the first and second surfaces and said body is angularly oriented with said body axis horizontal to provide a visual indicator that said body is in a horizontally level position.

8. A device for assisting in simultaneously adjusting of the angular orientation of first and second articles by holding the device in a single position with the first article to be mounted to a first substantially vertical surface and the second article to be mounted to a second substantially vertical surface where the first and second surfaces are not coplanar, comprising:

an elongated body having a longitudinal axis with first and second end portions separated along said longitudinal axis, said body having a substantially flat front wall formed from a flexible material with an elongated central portion extending between said first and second body end portions and a perimeter portion extending fully about said front wall central portion, and a rear wall formed from a flexible material with an elongated central portion extending between said first and second body end portions and a perimeter portion extending fully about said rear wall central portion, said front and rear wall central portions being in face-to-face juxtaposition and extending substantially coextensive with each other, said front and rear wall central portions being spaced apart and said front and rear wall perimeter portions being sealably joined together fully about said front and rear wall central portions to define a single continuous fluid-tight chamber extending between said first and second body end portions, said front wall being substantially transparent and said body having an angular orientation marking, said body and said body chamber therein being lengthwise bendable to simultaneously conform to the first and second surfaces when said rear wall is simultaneously in contact with both the first and second surfaces;

a first fluid within said body chamber; and a second fluid within said body chamber, said second fluid being immiscible with said first fluid to form a visible interface line between said first and second fluids extending between said first and second body end portions and which is in alignment with said angular orientation marking when said rear wall is substantially vertically oriented along its length coextensive with the first and second surfaces and said body is angularly oriented in a selected position.

* * * * *